United States Patent
Lin et al.

(10) Patent No.: US 7,000,516 B2
(45) Date of Patent: Feb. 21, 2006

(54) MULTIPURPOSE BLIND CUTTING MACHINE

(75) Inventors: Jung-Kuei Lin, Hsinchu (TW); Kuei-Lu Liu, Hsinchu (TW)

(73) Assignees: Industrial Technology Research Institute, Hsinchu Hsien (TW); Nien Made Enterprise Co., Ltd., Changhua Hsien (TW)

( * ) Notice: Subject to any disclaimer, the term of this patent is extended or adjusted under 35 U.S.C. 154(b) by 0 days.

(21) Appl. No.: 10/915,406

(22) Filed: Aug. 11, 2004

(65) Prior Publication Data

US 2005/0005750 A1    Jan. 13, 2005

Related U.S. Application Data

(62) Division of application No. 10/390,613, filed on Mar. 19, 2003, now abandoned.

(30) Foreign Application Priority Data

Nov. 15, 2002 (TW) ............................... 91218540 U

(51) Int. Cl.
*B26D 7/00* (2006.01)
*B23D 23/00* (2006.01)

(52) U.S. Cl. ............................... 83/197; 83/859; 83/68
(58) Field of Classification Search .................. 83/197, 83/469, 485, 397, 859, 109, 162, 167, 164, 83/104, 165, 58, 68, 571; 144/5; 29/24.5
See application file for complete search history.

(56) References Cited

U.S. PATENT DOCUMENTS

| | | | |
|---|---|---|---|
| 3,324,753 A | 6/1967 | Lindau | |
| 3,935,775 A | 2/1976 | Sato | |
| 5,799,557 A | 9/1998 | Wang | |
| 5,927,172 A | 7/1999 | Wang | |
| 6,079,306 A * | 6/2000 | Liu | ............................... 83/167 |
| 6,089,302 A | 7/2000 | Britt | |
| 6,412,381 B1 | 7/2002 | Wang et al. | |
| 6,604,443 B1 | 8/2003 | Roberts et al. | |
| 2003/0066403 A1 | 4/2003 | Lin et al. | |
| 2003/0140756 A1 | 7/2003 | Lin et al. | |

FOREIGN PATENT DOCUMENTS

DE    4211884    * 10/1993

* cited by examiner

*Primary Examiner*—Stephen Choi
(74) *Attorney, Agent, or Firm*—Browdy and Neimark, P.L.L.C.

(57) ABSTRACT

A multipurpose blind cutting machine is constructed to include a machine base, a first cutter unit and a second cutter unit mounted on the machine base and stacked with each other. The first cutter unit has a circular cutting blade and a cutter drive adapted to rotate the blade and to move the blade in a direction substantially perpendicular to the feeding direction of a blank blind to be cut. The second cutter unit has a locating molds having a plurality of positioning through holes for the positioning of parts of the blank blind to be cut, a cutting-off tool, and a cutter drive adapted to move the cutting-off tool in a direction substantially perpendicular to the feeding direction of the blank blind. A control unit is adapted to selectively control the operation of the first cutter unit and the second cutter unit.

2 Claims, 6 Drawing Sheets

US 7,000,516 B2

MULTIPURPOSE BLIND CUTTING MACHINE

RELATED APPLICATIONS

This application is a divisional of parent application Ser. No. 10/390,613, filed Mar. 9, 2003 now abandoned, the contents of which are incorporated herein by reference.

BACKGROUND OF THE INVENTION

1. Field of the Invention

The present invention relates generally to a Venetian blind and, more particularly, to a multipurpose blind cutting machine.

2. Description of the Related Art

Blind manufacturers provide few sizes (lengths of headrail, bottom rail and slats) for each model. Distributors or upholsterers may have to cut blinds purchased from factories subject to different windows to be covered with blinds. Conventionally, the headrail, bottom rail, and slats of a blank blind are separately cut. Various blind cutting machines for cutting the headrail, bottom rail, and slats at one time have been disclosed, and have appeared on the market. These blind cutting machines include two types, one using a circular saw blade to cut the workpiece as shown in U.S. Pat. No. 6,412,381, and the other using a cutting-off tool to cut the workpiece. Using a circular saw blade can cut the workpiece smoothly at a rapid speed, however it produces much dust during cutting. Further, because a circular saw blade can only produce a flat cut edge, it is not suitable for a fancy cutting. Exemplars of cutting-off tool type blind cutting machines are seen in U.S. Pat. Nos. 5,799,557; 5,927,172; 6,089,302. These designs commonly use mold block means to hold the headrail, bottom rail and slats in position for cutting, and a hydraulic cylinder or motor to drive a cutting-off tool to cut the workpiece. This cutting method produces less dust, and is practical for a fancy cutting. However, this cutting method is less efficient and, produces burrs at cutting edge. Because the aforesaid two types of blind cutting machines have different advantages and drawbacks, a blind distributor or upholsterer may have to prepare both types of blind cutting machines for selective use. It is not economic to prepare two types of blind cutting machines. Further, when two types of blind cutting machines are used, they occupy much floor space.

SUMMARY OF THE INVENTION

The present invention has been accomplished under the circumstances in view. It is therefore the main object of the present invention to provide a multipurpose blind cutting machine, which provides a saw cutting mode and a cutting-off cutting mode for selection.

It is another object of the present invention to provide a multipurpose blind cutting machine, which requires less floor installation space.

To achieve these objects of the present invention, the multipurpose blind cutting machine comprises a machine base; a first cutter unit and a second cutter unit installed in the machine base and stacked with each other. The first cutter unit has a circular cutting blade arranged in a direction that a center axis of the circular cutting blade extends in parallel to the feeding direction of a blank blind to be cut, and a cutter drive adapted to rotate the circular cutting blade and to move the circular cutting blade in a direction substantially perpendicular to the feeding direction of the blank blind to be cut. The second cutter unit has a locating mold having a plurality of positioning through holes for the positioning of parts of the blank blind to be cut, a cutting-off tool, and a cutter drive adapted to move the cutting-off tool in a direction substantially perpendicular to the feeding direction of the blank blind to be cut. A control unit is installed in the machine base and electrically connected to the first cutter unit and the second cutter unit and adapted to selectively control the operation of the first cutter unit and the second cutter unit.

DETAILED DESCRIPTION OF THE INVENTION

Figure 1:
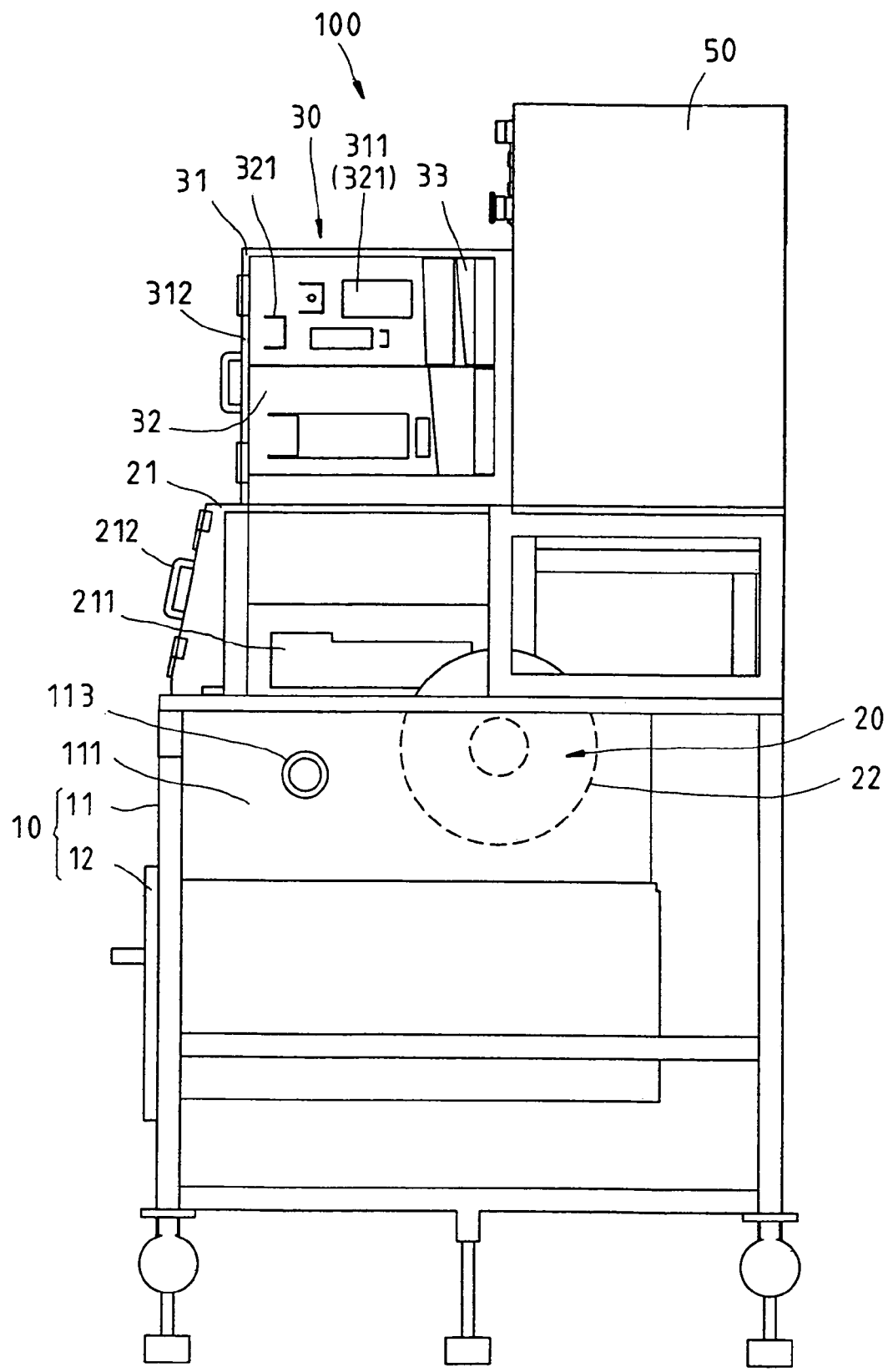
FIG. 1 is a front view of a multipurpose blind cutting machine according to the present invention.
Figure 2:
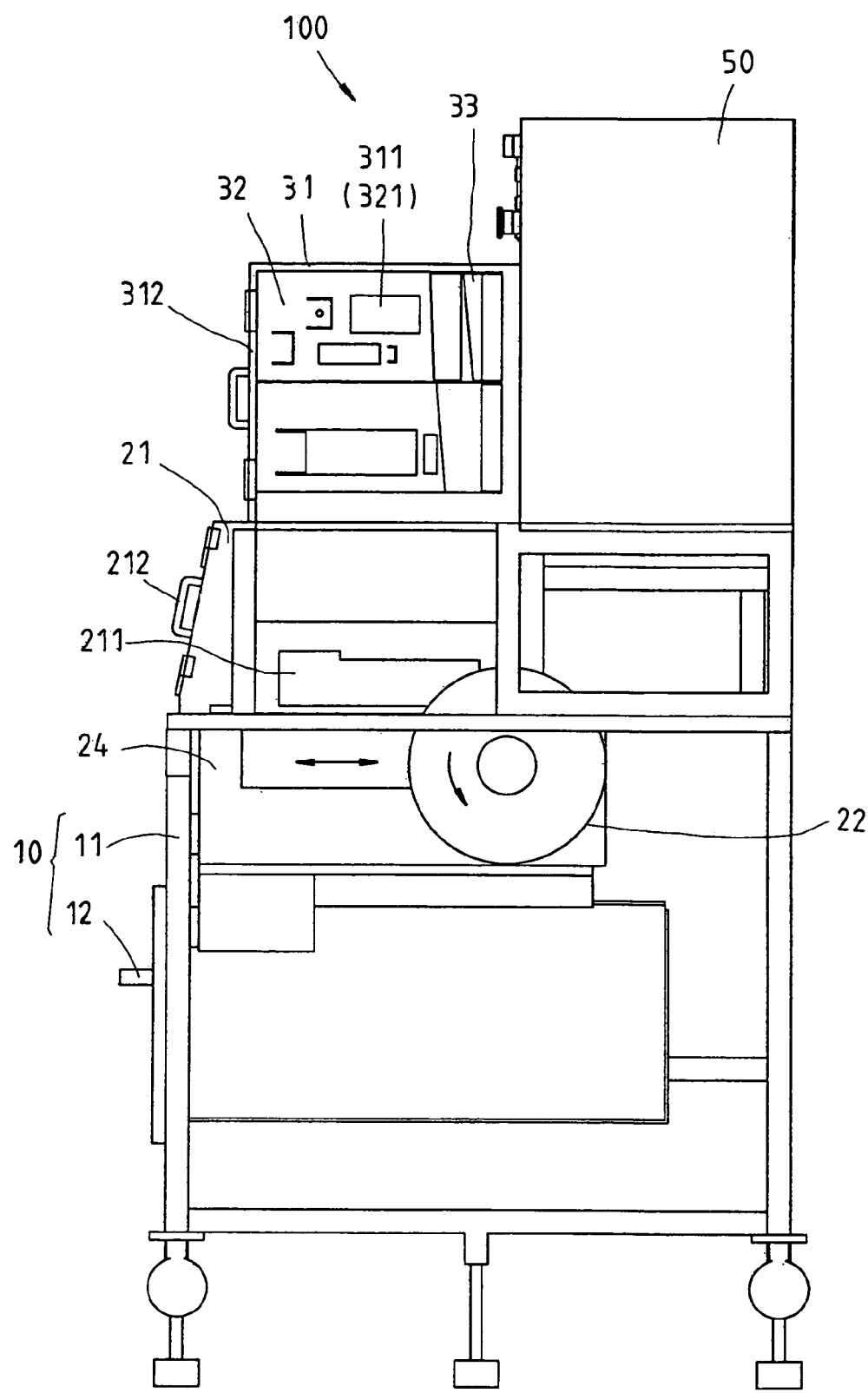
FIG. 2 is a sectional front view of the multipurpose blind cutting machine according to the present invention.
Figure 3:
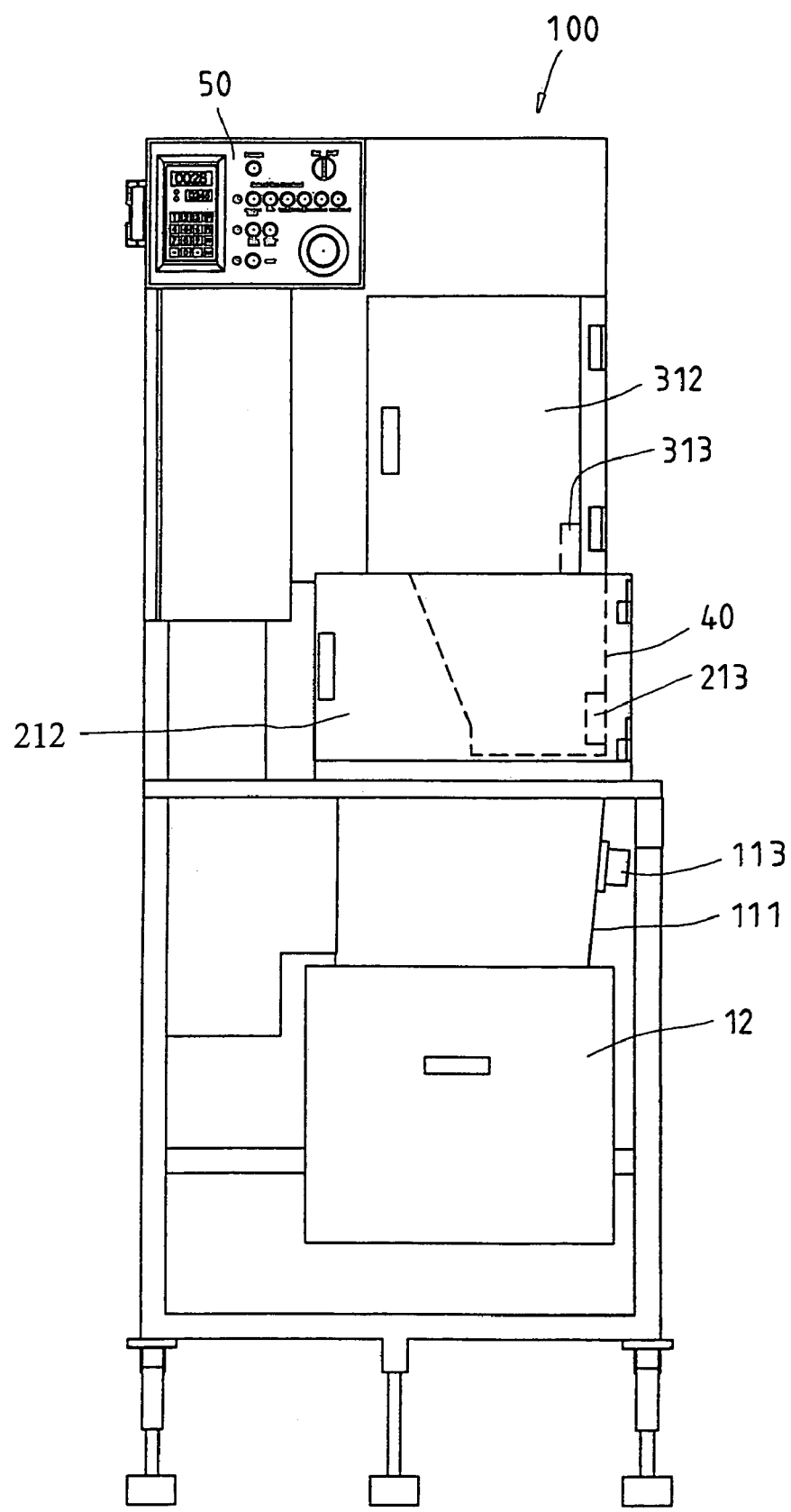
FIG. 3 is a left side view of the multipurpose blind cutting machine according to the present invention.
Figure 4:
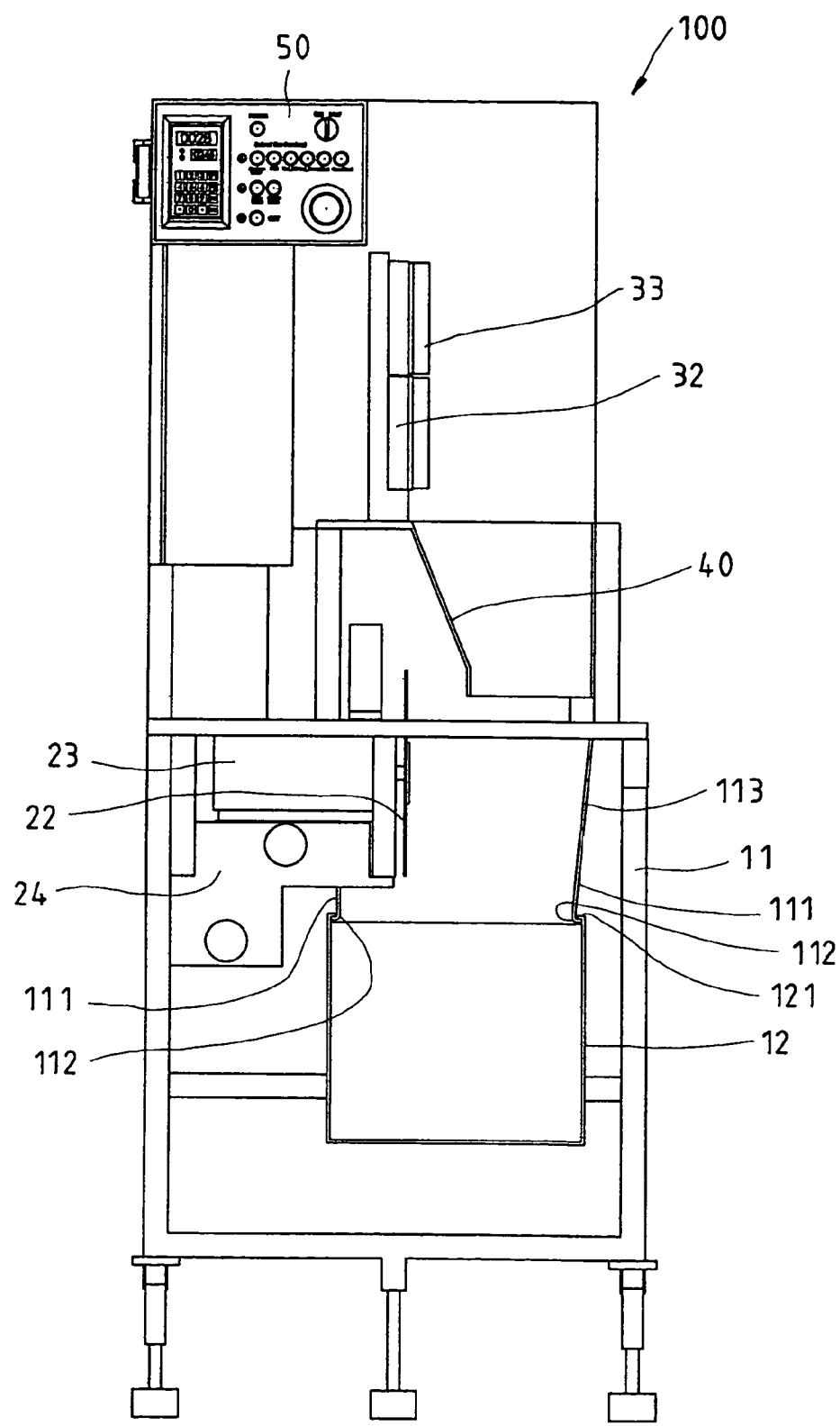
FIG. 4 is a sectional left side view of the multipurpose blind cutting machine according to the present invention.
Figure 6:
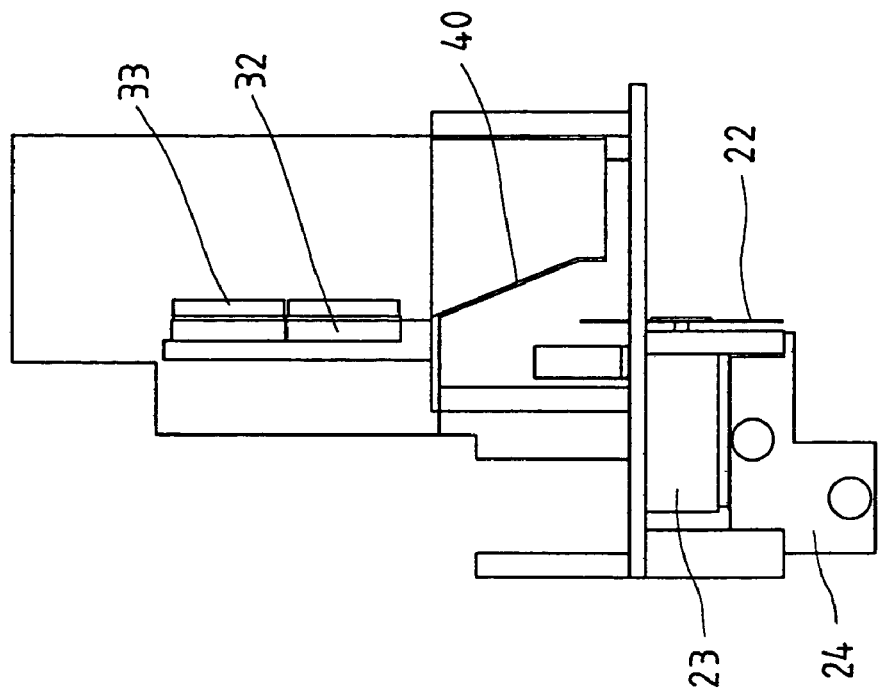
FIG. 6 is a side view in an enlarged scale of a part of the present invention, showing the arrangement of the first cutter unit and the second cutter unit.
Figure 5:
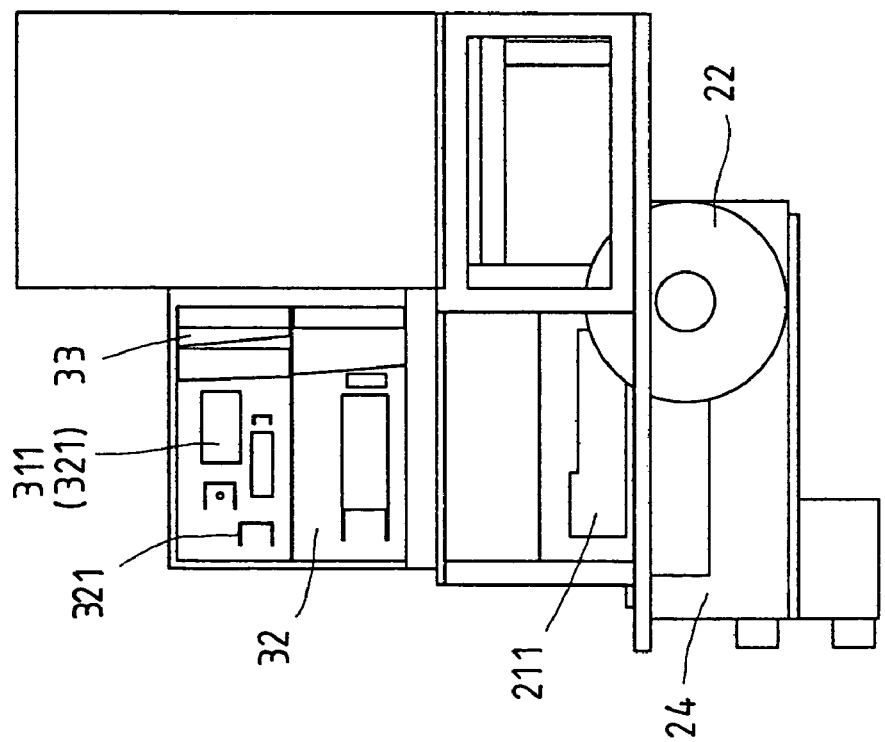
FIG. 5 is a front view in an enlarged scale of a part of the present invention, showing the arrangement of the first cutter unit and the second cutter unit.

Referring to FIGS. 1~7, a multipurpose blind cutting machine 100 is shown comprised of a machine base 10, a first cutter unit 20, a second cutter unit 30, a waste material separator 40, and a control unit 50.

The machine base 10 can stably be positioned on the floor, comprising a worktable 11 and a material basket 12. The worktable 11 is a four-leg table. Preferably, the four sides of the four-leg table of the worktable 11 are blocked with peripheral walls, defining a rectangular open space having top and bottom sides opened. The worktable 11 has two shielding boards 111 bilaterally suspended near the bottom open side (see FIG. 4), two guide rails 112 respectively provided at the bottom sides of the shielding boards 111, and a dust hole 113 in one shielding board 111 for holding a dust collector (not shown) adapted to collect dust and waste material chips produced from a blind cutting operation of the multipurpose blind cutting machine. The material basket 12 is mounted inside the worktable 11 for collecting waste materials from the blind been cut by the first cutter unit 20 and the second cutter unit 30. The material basket 12 is a rectangular top-open container, having two hooked flanges 121 bilaterally disposed at the top and respectively hooked on the guide rails 112 for enabling the material basket 12 to be moved horizontally in and out of the worktable 11 along the guide rails 111 (an opening should be provided in one side of the worktable 11, in case the four sides of the four-leg table of the worktable 11 are blocked with peripheral walls, so that the material basket 12 can be moved horizontally in and out of the worktable 11 along the guide rails 111.

The first cutter unit 20 is located on the top of the machine base 10, and adapted to cut the workpiece through a rotary motion. The first cutter unit 20 comprises a housing 21, a circular cutter blade 22, and a cutter drive 23. The housing 21 is a rectangular frame having the top and bottom sides opened. The bottom side of the housing 21 is fixedly fastened to the periphery of the top open side of the worktable 11 so that the inside space of the housing 21 is kept in communication with the inside space of the worktable 11. The housing 21 has an insertion hole 211 in the front side (see FIGS. 1 and 2) for the feeding of the workpiece, an access door 212 pivotally provided the left lateral side (see FIG. 3) for the access of the hands during a troubleshooting work, a micro switch 213 disposed on the inside and adapted to switch on/off the cutter drive 23 subject to the positioning status of the housing 21, i.e., the micro switch 213 switches on the blade drive 23 when the housing 21 closed, or switches off the cutter drive 23 when the housing 21 opened. The circular cutter blade 22 is mounted inside the housing 21 and partially protruding over the open top of the housing 21. The circular cutter blade 22 is rotatably connected to the cutter drive 23 in such a direction that the center axis of the circular cutter blade 22 extends in parallel to the workpiece feeding direction. The cutter drive 23 is mounted on a sliding block 24 that can be moved horizontally leftwards/rightwards (see FIG. 2), and controlled to rotate the circular cutter blade 22 at a high speed. The slidably positioning structure of the sliding block 24 can easily be achieved by conventional techniques. For example, a motor and a screw rod may be used to sliding block 24.

The second cutter unit 30, which is basically a prior art known by the one skilled in the relative field, is located on the top of the machine base 10, and adapted to hold down the workpiece and to cut off the workpiece through a reciprocating motion. According to the present preferred embodiment, the second cutter unit 30 comprises a housing 31 fixedly mounted on the top of the housing 21 of the first cutter unit 20, at least one, for example, two locating molds 32, a cutting-off tool 33, and a cutter drive (not shown).

The housing 31 is a rectangular open frame having the top and bottom sides opened. The bottom side of the housing 31 of the second cutter unit 30 is fixedly fastened to the periphery of the top open side of the housing 21 of the first cutter unit 20 such that the inside space of the housing 31 is kept in communication with the inside space of the housing 21 and the inside space of the machine base 10. The housing 31 has an insertion hole 311 in the front side (i.e., the same side as the insertion hole 211 of the first cutter unit 20; see FIGS. 1 and 2) for the feeding of the workpiece, an access door 312 pivotally provided the left lateral side (see FIG. 3) for the access of the hands during a troubleshooting work, a micro switch 313 disposed on the inside and adapted to switch on/off the cutter drive 33 subject to the positioning status of the housing 31, i.e., the micro switch 313 switches on the blade drive 33 when the housing 31 closed, or switches off the cutter drive 33 when the housing 31 opened. The locating molds 32 are vertically aligned and fixedly fastened to the inner surface of one peripheral wall of the housing 31 having the insertion hole 311. Each locating mold 32 has a plurality of positioning holes 321 made subject to the cross-sections of parts, i.e. the headrail, slats, bottom rails, of a blind. The positioning holes 321 extended from one side, namely, the first side (facing the insertion hole 311) of the respective locating mold 32 to the opposite side, namely, the second side thereof. The positioning holes 321 of the locating molds 32 are aimed at the insertion hole 311. The parts of the blind to be cut are inserted through the insertion hole 31 and the positioning holes 321 to the inside of the housing 31 for cutting. The positioning holes 321 of the locating molds 32 have different shapes and sizes to fit different models of blinds. The cutter drive of the second cutter unit 30 is adapted to reciprocate the cutting-off tool 32 along the second side of the locating molds 32.

The waste material separator 40 is adapted to separate waste materials cut from the workpiece by the first cutter unit 20 and the second cutter unit 30. According to the present preferred embodiment, the waste material separator 40 is shaped like a hopper having a greater top open side and a narrower bottom open side. The periphery of the top open side of the waste material separator 40 is connected to the inside wall around the bottom open side of the housing 31. The waste material separator 40 has one sidewall (the side corresponding to the locating molds 32 and the circular cutter blade 22) slopes downwardly inwards in direction toward the opposite side and then turned vertically downwards so as not to interfere with the movement of the circular cutter blade 22 when the cutter drive 23 moved with the sliding block 24 (see FIG. 2). The bottom open side of the waste material separator 40 is directly connected to the material basket 12.

The control unit 50 has a power distribution circuit and a control circuit board arranged on the inside, and electrically connected to the cutter drive 23 and micro switch 213 of the first cutter unit 20 and the cutter drive and micro switch 313 of the second cutter unit 30. Switches, control buttons, and display means are provided on the outside of the control unit for controlling the operation of the first cutter unit 20 and the second cutter unit 30 (including the respective cutter drives).

Figure 7:
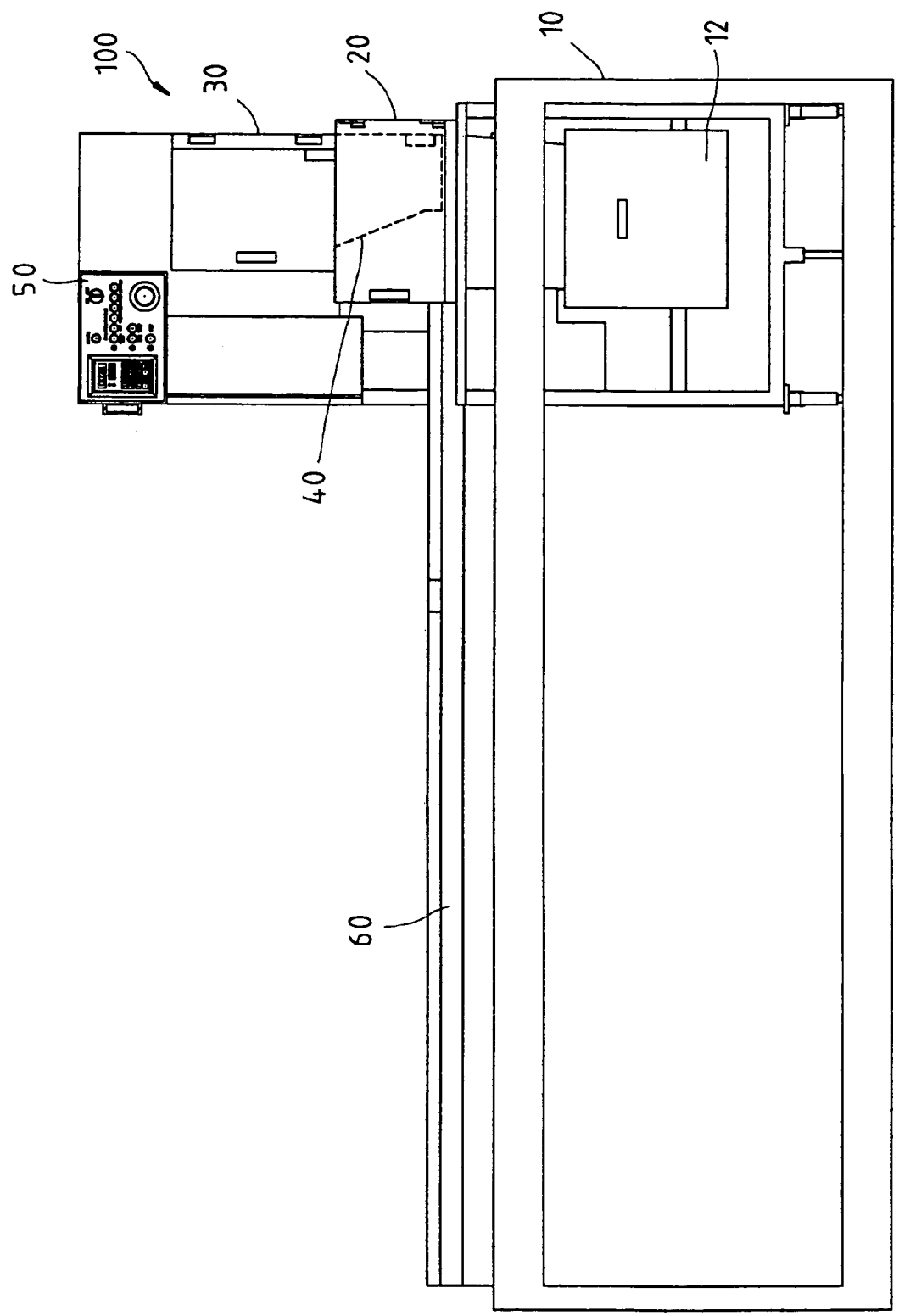
FIG. 7 is a side view of the present invention, showing the multipurpose blind cutting machine arranged with a feed table.

The operation of the multipurpose blind cutting machine is outlined hereinafter with reference to FIG. 7. A feed table 60 is provided to carry the blank blind (of which the length is slightly longer than the desired headrail, slats and bottom rail) into the first cutter unit 20 or the second cutter unit 30 (subject to the material, cutting shade, . . . etc.,), and then operate the control buttons of the control unit 50 to drive the circular cutting blade 22 or the cutting-off tool 33 to cut off the workpiece. For example, when the saw-cutting mode is selected, the workpiece is inserted through the insertion hole 211 of the housing 21 into the inside of the first cutter unit 20, and then the control unit 50 is controlled to drive the cutter drive 23, causing it to rotate the circular cutting blade 22 at a high speed against the workpiece and to move the circular cutting blade 21 horizontally, and therefore the inserted workpiece is properly cut. Cutoff waste materials directly fell to the basket 12. Dust produced during cutting is collected by the dust collector been fastened to the dust hole 113. When the sliding block 24 moved to the position of end of feeding, it triggers the cutter drive 23 to move in the reversed direction, thereby causing the sliding block 24 to be moved to the position of start of feeding, and the circular cutting blade 22 is stopped at this time, ending the cutting action. When the cutting-off mode is selected, the headrail, slats and bottom rail of the blank blind are inserted through the insertion hole 311 of the housing 31 into the corresponding locating holes 321 of the locating molds 32, and then the cutter drive is controlled to reciprocate the cutting-off tool 33 along the second sides of the locating molds 32 to cut off the inserted parts of the workpiece. The cut-off waste parts fall to the waste material separator 40 and then to the material basket 12. Therefore, cut-off waste parts do not fall to the path of the circular cutting blade 22 of the first cutter unit 20. When the cutter drive of the second cutter unit 30 moved to the end position of cutting, it is triggered to reverse (retract), returning the cutting-off tool 33 to the former start position of cutting for a next cutting operation.

The aforesaid feed table 60 can be a lifting table that can be lifted to the elevation of the first cutter unit 20 or the elevation of the second cutter unit 30 subject to the type of the workpiece to be cut. The feed table 60 may be eliminated to save the cost. In this case, the operator can feed the workpiece into the first cutter unit 20 or the second cutter unit 30 manually.

Further, several locating molds may be prepared for use selectively subject to the type of the workpiece to be cut, so that the multipurpose blind cutting machine is capable of cutting any of a variety of blank blinds. Because the first cutter unit 20 and the second cutter unit 30 have a respective independent operation space and mechanism, they do not interfere with each other even if the first cutter unit is arranged above the second cutter unit.

As indicated above, the multipurpose blind cutting machine of the present invention has the advantages as follows:

1. Cost-Saving and Space-Saving:

Two cutter units are provided for saw cutting operation and cutting-off operation so that the user can use the multipurpose blind cutting machine to cut different blank blinds instead of the use of two different multipurpose blind cutting machines. Because the two cutter units are vertically arranged in a stack, the multipurpose blind cutting machine requires less floor space.

2. Machine Operation Free From Waste Material

The multipurpose blind cutting machine is equipped with a waste material separator that guides cut-off waste materials to a material basket, preventing sticking of cut-off waste material in the cutter units or other parts of the multipurpose blind cutting machine or striking of cut-off waste material against any part (for example, the circular cutting blade) of the internal mechanism of the multipurpose blind cutting machine.

3. Separated Collection of Waste Materials and Dust

A dust collector can be installed in the machine base to collect dust and material chips during cutting, preventing inhalation of dust by the operator or accumulation of dust in the parts of the first and second cutter units.

4. Each Collection and Handling of Waste Materials

The material basket can easily be moved in and out of the worktable for easy handling of waste materials.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A multipurpose blind cutting machine adapted to cut blank blinds, comprising:

a machine base;

a first cutter unit installed in said machine base, said first cutter unit having a circular cutting blade arranged in a direction that a center axis of said circular cutting blade extends in parallel to a feeding direction of the blank blind to be cut, and a cutter drive adapted to rotate said circular cutting blade and to move said circular cutting blade in a direction substantially perpendicular to the feeding direction of the blank blind to be cut;

a second cutter unit installed in said machine base and arranged with said first cutter unit in a stack, said second cutter unit having a locating mold having a plurality of positioning through holes for the positioning of parts of the blank blind to be cut, a cutting-off tool, and a cutter drive adapted to move said cutting-off tool in a direction substantially perpendicular to the feeding direction of the blank blind to be cut; and a control unit installed in said machine base and electrically connected to said first cutter unit and said second cutter unit and adapted to selectively control the operation of said first cutter unit and said second cutter unit, wherein said machine base has a worktable having an open top; said first cutter unit further comprises a housing adapted to accommodate the circular cutting blade and cutter drive of said first cutter unit, the housing of said first cutter unit having an open top side, an open bottom side fixedly fastened to the periphery of the open top of said worktable, an insertion hole in a side thereof for the insertion of the blank blind into said first cutter unit for cutting, an access door hinged to another side thereof and turnable between a close position and an open position; said second cutter unit further comprises a housing adapted to accommodate the cutting-off tool, the locating mold and the cutter drive of said second cutter unit, the housing of said second cutter unit having an open top side, an open bottom side fixedly fastened to the periphery of the open top side of the housing of said first cutter unit, an insertion hole in a side thereof for the insertion of the blank blind to be cut, and an access door hinged to another side thereof and turnable between a close position and an open position.

2. The multipurpose blind cutting machine as claimed in claim 1, wherein said first cutter unit further comprises a micro switch adapted to turn on/off the cutter drive of said first cutter unit subject to the closing/opening status of the access door of said first cutter unit; said second cutter unit further comprises a micro switch adapted to turn on/off the cutter drive of said second cutter unit subject to the closing/opening status of the access door of said second cutter unit.

* * * * *